US009506568B2

(12) United States Patent
Elbacher et al.

(10) Patent No.: US 9,506,568 B2
(45) Date of Patent: Nov. 29, 2016

(54) SEALING ELEMENT WITH ADDITIONAL RING

(71) Applicant: PAUL MÜLLER GMBH & CO. KG UNTERNEHMENSBETEILIGUNGEN, Nürnberg (DE)

(72) Inventors: Manfred Elbacher, Nuremberg (DE); Andreas Radke, Nuremberg (DE)

(73) Assignee: Paul Mueller GmbH & Co. KG Unternehmensbeteiligungen, Nuremberg (DE)

( * ) Notice: Subject to any disclaimer, the term of this patent is extended or adjusted under 35 U.S.C. 154(b) by 0 days.

(21) Appl. No.: 14/906,675

(22) PCT Filed: Aug. 19, 2014

(86) PCT No.: PCT/DE2014/100292
§ 371 (c)(1),
(2) Date: Jan. 21, 2016

(87) PCT Pub. No.: WO2015/032385
PCT Pub. Date: Mar. 12, 2015

(65) Prior Publication Data
US 2016/0161003 A1 Jun. 9, 2016

(30) Foreign Application Priority Data
Sep. 5, 2013 (DE) .................... 20 2013 104 012 U

(51) Int. Cl.
*F16J 15/447* (2006.01)
(52) U.S. Cl.
CPC ......... *F16J 15/4472* (2013.01); *F16J 15/4474* (2013.01); *F16J 15/4476* (2013.01); *F16J 15/4478* (2013.01)

(58) Field of Classification Search
CPC ...... F01D 11/00; F01D 11/02; F01D 11/025; F01D 11/04; F01D 11/06; F16J 15/447; F16J 15/4472; F16J 15/4474; F16J 15/4476; F16J 15/4478
See application file for complete search history.

(56) References Cited

U.S. PATENT DOCUMENTS

| 5,174,583 A | 12/1992 | Orlowski et al. |
| 7,878,508 B2 * | 2/2011 | Nobrega ............... F04D 29/106 277/352 |
| 8,820,749 B2 * | 9/2014 | Tones ................... F16J 15/4478 277/411 |

FOREIGN PATENT DOCUMENTS

DE 11 09 470 B 6/1961

OTHER PUBLICATIONS

International Search Report of PCT/DE2014/100292, mailed Jan. 29, 2015.

*Primary Examiner* — Gilbert Lee
(74) *Attorney, Agent, or Firm* — Collard & Roe, P.C.

(57) ABSTRACT

A sealing element for sealing a cylindrical inner surface of a first machine component and a cylindrical outer surface of a second machine component includes an inner ring, an additional ring arranged coaxially to the inner ring, the additional ring being connected to a part of an outside lateral face of the inner ring, an outer ring arranged coaxially to the inner ring, and a sealing gap, which is formed by an external lateral face of the inner ring, an internal lateral face of the outer ring and an external lateral face and an end face of the additional ring and which in axial section through the common axis of the inner ring, the outer ring and the additional ring has a meandering profile.

9 Claims, 3 Drawing Sheets

SEALING ELEMENT WITH ADDITIONAL RING

CROSS REFERENCE TO RELATED APPLICATIONS

This application is the National Stage of PCT/DE2014/100292 filed on Aug. 19, 2014, which claims priority under 35 U.S.C. §119 of German Application No. 20 2013 104 012.6 filed on Sep. 5, 2013, the disclosure of which is incorporated by reference. The international application under PCT article 21(2) was not published in English.

The invention relates to a sealing element for sealing a cylindrical inner surface of a first machine component and a cylindrical outer surface of a second machine component.

Sealing elements configured as so-called gap or labyrinth seals are previously known. In these gap or labyrinth seals, contactless sealing is effected by the provision of a sealing gap which in general is of meandering configuration. However, there is the possibility of ambient media (in particular liquids) penetrating into this sealing gap. Consequently, gap or labyrinth seals are generally not absolutely tight, but instead enable the passage of ambient media to a certain degree.

The object of the invention is to offer a sealing element having improved sealing characteristics.

This object is achieved by a sealing element having the features of claim 1. Advantageous embodiments are described in the subclaims.

The sealing element according to the invention serves to seal a cylindrical inner surface of a first machine component and a cylindrical outer surface of a second machine component. The sealing element according to the invention possesses an inner ring, an additional ring arranged coaxially with respect to the inner ring, an outer ring arranged coaxially with respect to the inner ring, and a sealing gap, which is formed by an outer shell surface of the inner ring, an inner shell surface of the outer ring and by an outer shell surface and a face side (end face) of the additional ring. The additional ring is connected to a part of an outer shell surface of the inner ring. The sealing gap has a meandering profile in an axial section through the common axis of the inner ring, outer ring and additional ring.

Through the presence of the additional ring, the sealing gap acquires a profile which has an undercut. Thus a sealing gap having a particularly long "sealing path" is possible. In particular, the additional ring forms a type of "collecting channel" for the ambient medium entering the sealing gap. In this collecting channel, when the machine components to be sealed are at a standstill, the ambient medium (typically liquid) is collected and can then subsequently—upon relative movement of the machine components to be sealed—be transported away by centrifugal forces (for instance by the return feed described in greater detail further below). The additional ring thus forms a further obstacle to the penetrating medium and in this way improves the sealing characteristics of the sealing element.

A further advantage of the additional ring lies in the fact that it limits the relative movement of the inner ring relative to the outer ring in the axial direction and thus helps to prevent disintegration of the sealing element. In other words, the additional ring produces a non-disintegrating sealing element.

In an advantageous embodiment, the profile of the sealing gap has the following profile portions: (a) an inlet portion as a first end portion of the sealing gap having a first radius to the common axis; (b) an outlet portion as a second end portion of the sealing gap having a second radius to the common axis, wherein the second radius is smaller than the first radius; and (c) a meandering portion configured between the inlet portion and the outlet portion. The outer shell surface of the additional ring herein forms a boundary surface of the outlet portion, in particular the radially inner boundary surface of the outlet portion.

In other words, the additional ring is placed on the outlet portion side, and the outer shell surface of the additional ring and that face side of the additional ring which is situated in the direction of the inlet portion form boundary surfaces of the sealing gap. In particular, the outer shell surface of the additional ring forms the radially inner boundary surface of the outlet portion of the sealing gap and that face side of the additional ring which is situated in the direction of the inlet portion forms a boundary surface of an axial gap of the meandering portion of the sealing gap.

The formation of a press fit, in particular a press fit in which the inner shell surface of the additional ring is pressed together with the outer shell surface of the inner ring, has proved to be an advantageous connection method for connecting the additional ring to the inner ring.

In this advantageous embodiment, the outlet portion possesses a lesser radius than the inlet portion. In this way, liquids which penetrate into the sealing gap from the inlet side, upon rotation of the machine elements to be sealed, are transported back to the inlet portion by virtue of centrifugal forces, i.e. a so-called return feed takes place. This in turn improves the sealing characteristics of the sealing element. In addition, the collecting channel formed by the additional ring is located on the outlet portion side and serves to collect the ambient media which have penetrated that far.

In a further advantageous embodiment, the inner ring and/or the outer ring consist of a steel material, in particular of a hardened steel material. In this way, the inner ring and the outer ring possess such high strength that the sealing element, apart from the sealing function, can additionally serve as an adjusting element for further machine components (in particular ball/roller bearings). It is thus possible to create installation situations in which the sealing element is positioned directly adjacent to a ball/roller bearing and tensions (adjusts) the latter. The spacer sleeves which are usually used for adjustment purposes can thus be dispensed with. This in turn leads to a space-saving construction and a reduction of the required components.

If particularly high standards are placed on the dimensional stability of the construction, then in a particularly advantageous embodiment one or more component surfaces of the inner ring and/or of the outer ring, in particular the end faces of the inner ring and/or of the outer ring, can be surface ground. In particular in combination with the embodiment of the inner ring and of the outer ring as a hardened steel ring, an inner or outer ring which is particularly well suited to the adjustment of a ball/roller bearing is in this way obtained.

Apart from the inner ring and/or the outer ring, the additional ring can also be made of a steel material, if necessary also of a hardened steel material.

Should the possibility of adjustment be relinquished and/or if lesser requirements are placed on the strength and temperature stability of the sealing element, then, instead of the steel material, an aluminum material (aluminum alloy) can also be used for the additional ring, the inner ring and/or the outer ring.

In a further advantageous embodiment, the meandering portion of the sealing gap, starting from the inlet portion and ending at the outlet portion, has the following segments: (a) a first radial gap; (b) a first axial gap, which has a radius smaller than the inlet portion; (c) a second radial gap; (d) a second axial gap, which has a radius smaller than the first axial gap; (e) a third radial gap; (f) a combined axial-radial gap; (g) a third axial gap, which has a radius smaller than the outlet portion; and (h) a fourth radial gap.

A radial gap is in this case understood to mean a gap which extends in the radial direction relative to the common axis. An axial gap is accordingly understood to mean a gap which extends in the axial direction relative to the common axis. The combined axial-radial gap is consequently a gap having a radial and axial component.

Particularly advantageously, the first axial gap and the second axial gap respectively possess a gap height which is smaller than the gap height of the inlet portion.

As a result of the above-described design of the meandering portion, a particularly high sealing effect can be achieved. The first radial gap, for instance, serves to screen off the penetrating ambient medium. The relatively low gap height of the first axial gap reduces the possible flow volume and in this way makes it more difficult for the infiltrated ambient medium to flow further. The second radial gap serves for the return feed of the infiltrated medium. The second axial gap can generate a fluid cushion against the passage of the ambient medium. The third radial gap serves for the return feed and run-off of ambient medium which has settled in the collecting channel when the machine components to be sealed have been at a standstill. The axial-radial gap serves for the return feed and, by virtue of the relatively large gap height, prevents the formation of capillary forces. The fourth radial gap opens out into the outlet portion and forms, together with the axial-radial gap, the collecting channel.

All in all, the penetration or passage of an ambient medium starting at the inlet portion and extending to the outlet portion is made more difficult by the above-described design of the meandering portion such that, even when the machine component to be sealed is at a standstill, in the technically relevant region almost complete seal tightness can be achieved—even though the sealing element in question is contactless.

In a particularly advantageous embodiment, the third radial gap has an offset. An offset of this type additionally improves the sealing effect, since it constitutes a further obstacle to the penetrating ambient medium and, at the same time, permits a return feed.

The invention is further illustrated on the basis of illustrative embodiments in the drawing figures, wherein.

Parts which are the same or have the same effect are provided in the figures with the same reference symbols.

Figure 1:
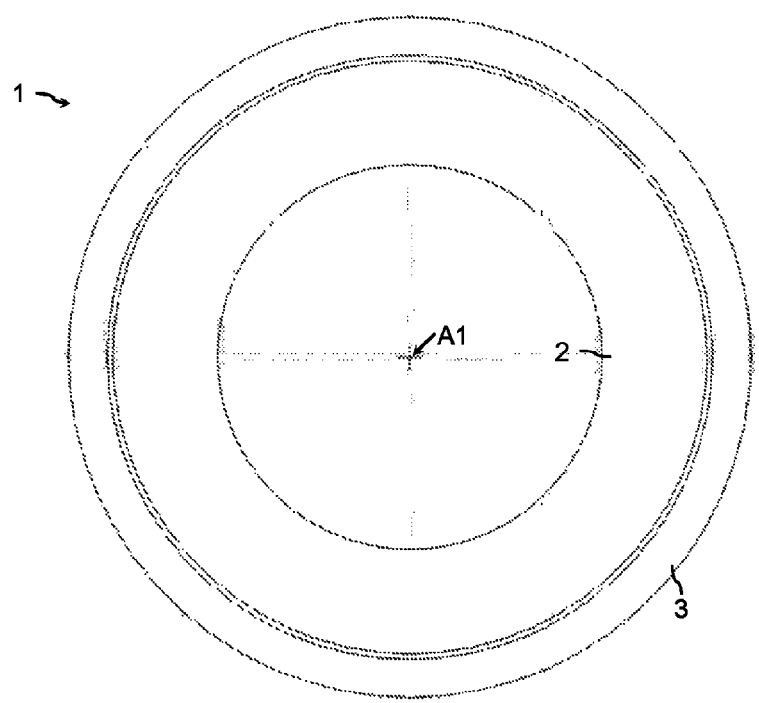
FIG. 1 shows a side view of a sealing element.
Figure 2:
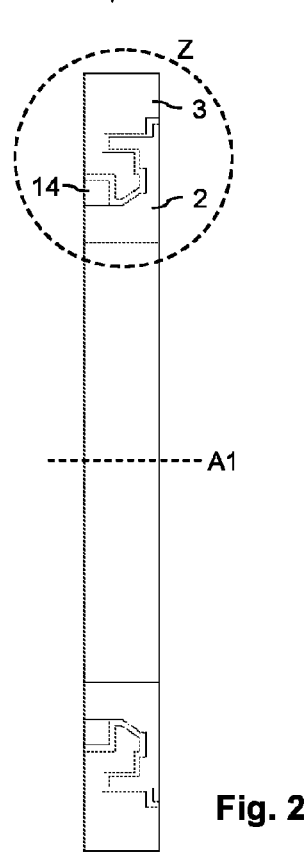
FIG. 2 shows an axial section of the sealing element through the common axis.
Figure 3:
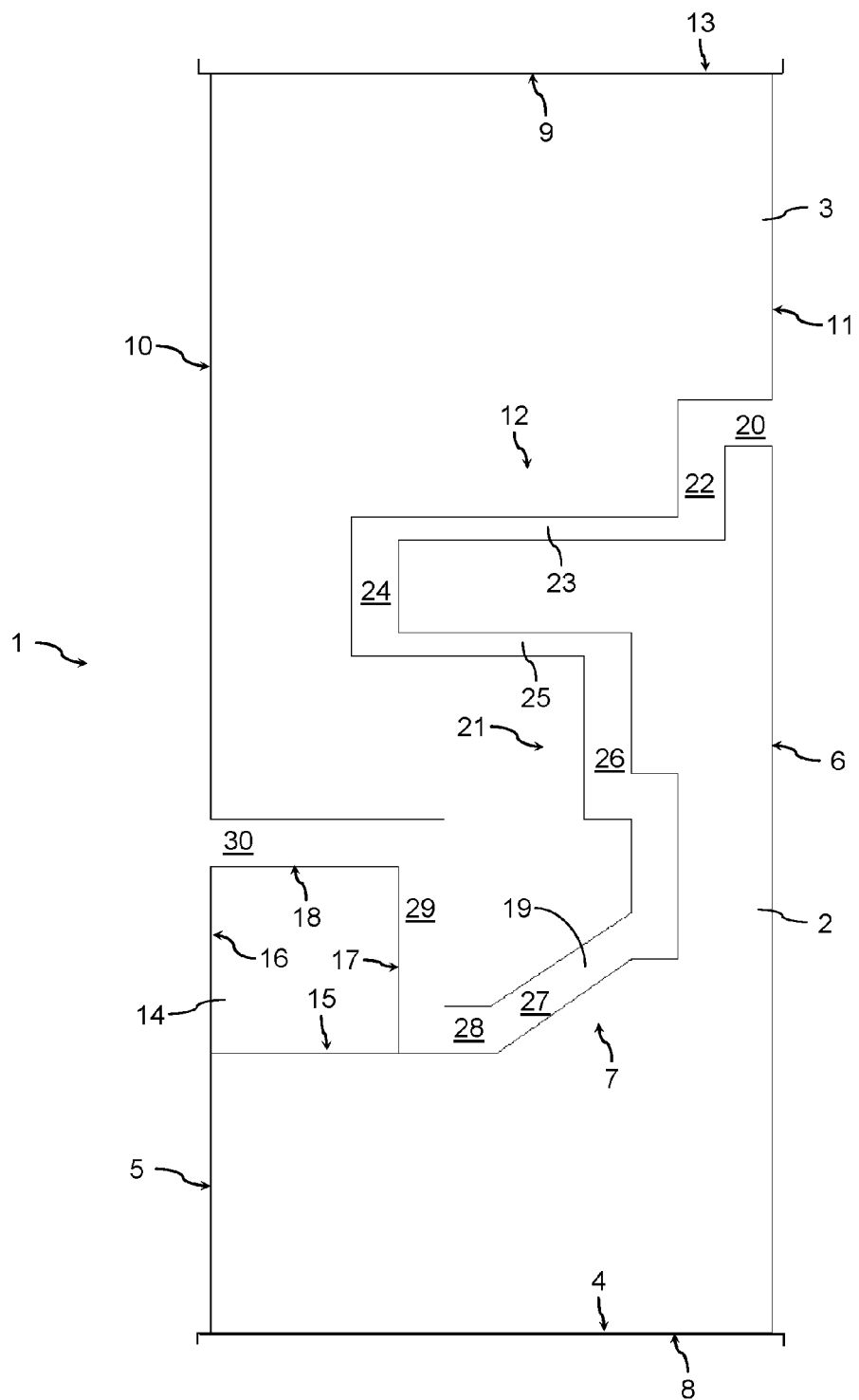
FIG. 3 shows an enlarged detail of the region Z from FIG. 2 with additionally represented surfaces of machine components to be sealed.

The sealing element 1 represented in FIGS. 1 to 3 is of rotationally symmetric configuration and possesses a substantially annular basic structure. The sealing element 1 has an inner ring 2 and an outer ring 3 arranged coaxially thereto. The inner ring 2 and the outer ring 3 are arranged coaxially with respect to the common axis A1.

The inner ring 2 possesses a substantially axially running inner shell surface 4, a first side face (end face) 5, a second side face (end face) 6, and an outer shell surface 7. The inner shell surface 4 is connected to a cylindrical outer surface 8 of a machine component. The first side face 5 and the second side face 6 run substantially radially. The first side face 5 is less wide than the second side face 6.

The outer ring 3 possesses a substantially axially running outer shell surface 9, a first side face (end face) 10, a second side face (end face) 11, and an inner shell surface 12. The outer shell surface 9 is connected to a cylindrical inner surface 13 of a further machine component. The first side face 10 and the second side face 11 run substantially radially. The first side face 10 is wider than the second side face 11.

Furthermore, the sealing element 1 has an additional ring 14. The additional ring possesses an axially running inner shell surface 15, a first side face (end face) 16, a second side face (end face/face side) 17, and an outer shell surface 18. The inner shell surface 15 is connected to a part of the outer shell surface 7 of the inner ring 2 by a press fit. The first side face 16 and the second side face 17 run substantially radially. The second side face 17 corresponds to a "face side of the additional ring" within the meaning of the present invention.

The inner shell surface 12 of the outer ring 3 on the one hand, and the outer shell surface 7 of the inner ring 2, as well as the outer shell surface 18 and the second side face 17 of the additional ring 14, on the other hand, form between them a sealing gap 19. In other words, the inner shell surface 12 of the outer ring 3 and the outer shell surface 7 of the inner ring 2, and the inner shell surface 12 of the outer ring 3 and the outer shell surface 18 of the additional ring 14, do not make contact with one another, but rather an annular gap, namely the sealing gap 19, remains.

That profile of the sealing gap 19 which is represented in FIG. 2 and FIG. 3—and thus the sealing gap 19 itself—has in the region of the second side face 6 or 11 an end portion. This end portion is referred to below as the inlet portion 15. This inlet portion 20 has as the distance to the common axis A1 a distance equal to a first radius. The inlet portion 20 is configured as an axially running gap (i.e. axial gap).

Adjoining the inlet portion 20 is the meandering portion 21. This meandering portion 21 possesses a profile which in general can be described as meandering (zigzag-shaped). This meandering profile consists of a combination of axial, radial and axial-radial gaps.

More accurately, the meandering portion 21 of the sealing gap 19, starting from the inlet portion, has the following segments: (a) a first radial gap 22; (b) a first axial gap 23, which has a radius smaller than the inlet portion 20 and a gap height smaller than the inlet portion 20; (c) a second radial gap 24; (d) a second axial gap 25, which has a radius smaller than the first axial gap 23 and a gap height smaller than the inlet portion 20; (e) a third radial gap 26 having an offset; (f) a combined axial-radial gap 27; (g) a third axial gap 28, which has a radius smaller than an outlet portion 30; and (h) a fourth radial gap 29.

A boundary surface of the fourth radial gap 29 is formed by the second side face 17 of the additional ring 14. Furthermore, the axial-radial gap 27, the third axial gap 28 and the fourth axial gap 29 form a type of collecting channel. The fourth radial gap 29 is further configured as an undercut.

Adjoining the meandering portion 21 is an outlet portion 30 of the sealing gap 19. The outlet portion 30 is an end portion of the sealing gap 19 in the region of the first side face 10 or 16. The outlet portion 30 is configured as an axially running portion (axial gap). The outlet portion 30 has as the distance to the common axis A1 a distance equal to a second radius. The second radius is less than the first radius of the inlet portion 20. The, in the radial direction, inner boundary surface of the outlet portion 30 is formed by the outer shell surface 18 of the additional ring 19.

The sealing element 1 represented in the figures is produced from a steel material. The inner ring 2 and the outer ring 3 have been hardened. Moreover, the end faces 5, 6 of the inner ring 2 and the end faces 10, 11 of the outer ring 3 have been surface ground.

Figure 4:
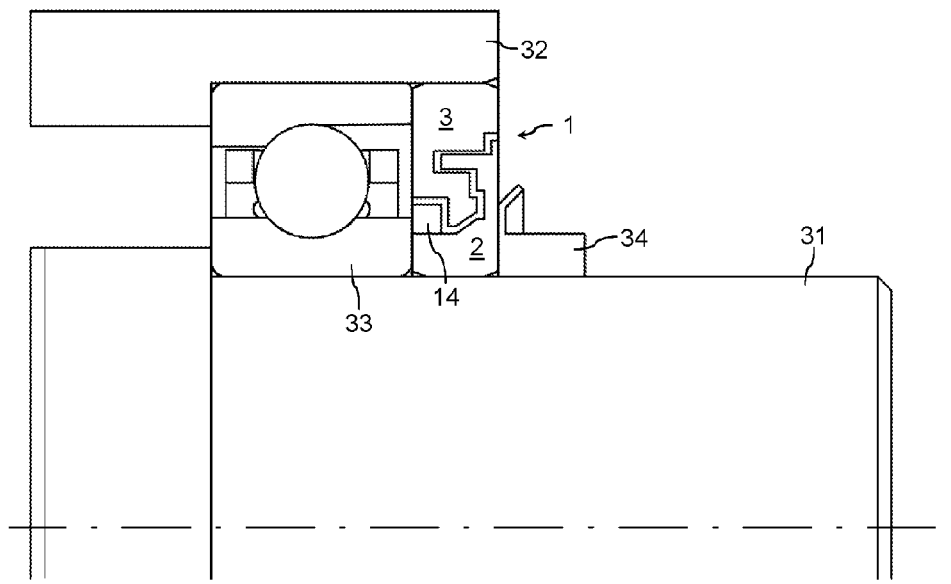
FIG. 4 shows the sealing element from FIGS. 1 to 3 in a first installation situation.
Figure 5:
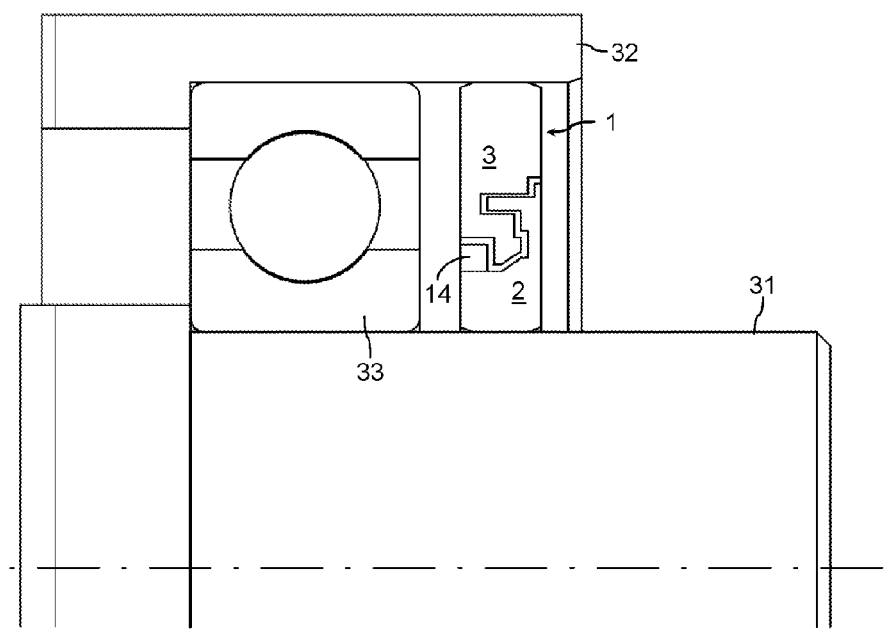
FIG. 5 shows the sealing element from FIGS. 1 to 3 in a further installation situation.

FIGS. 4 and 5 show different installation situations of the sealing element 1, i.e. the installation and the cooperation of the sealing element 1 with further machine components.

FIGS. 4 and 5 respectively show a shaft 31, a housing part 32, a ball bearing 33 and the sealing element 1. The sealing element 1 consists—as described above—of the inner ring 2, the outer ring 3 and the additional ring 14. The housing part 32 constitutes a "first machine component" within the meaning of the present invention, and the shaft 31 a "second machine component" within the meaning of the invention. The seal 1 consequently serves to seal a cylindrical inner surface of the housing part 32 and a cylindrical outer surface of the shaft 31. Between the shaft 31 and the housing part 32 is additionally placed the ball bearing 33. The ball bearing 33 is configured in FIG. 4 as a spindle ball bearing. In FIG. 5, the ball bearing 33 is configured as a deep groove ball bearing.

In the installation situation represented in FIG. 4 ("spindle ball bearing"), the sealing element 1 is placed in the axial direction directly adjacent to the ball bearing 33. By means of a shaft nut 34, the sealing element 1 can be pressed against the ball bearing 33. In this way, a preloading (adjustment) of the ball bearing 33 is effected by means of the seal 1. More accurately, the ball bearing 33 is adjusted by means of the hardened, surface ground inner ring 2. The otherwise customary spacer sleeves are not necessary.

In the installation situation ("deep groove ball bearing") represented in FIG. 5, the sealing element 1 is not placed directly adjacent to the ball bearing 33, i.e. the sealing element 1 is placed at a distance from the ball bearing 33, viewed in the axial direction. Consequently, in this installation situation, no adjustment of the ball bearing 33 is effected by means of the seal 1. In this installation situation, the use of surface ground outer and inner rings can therefore, if necessary, be relinquished. It is also possible, in an installation situation of this type, to use a sealing element 1 consisting of an aluminum alloy.

REFERENCE SYMBOL LIST

1 Sealing element
2 Inner ring
3 Outer ring
4 Inner shell surface
5 First side face, first end face
6 Second side face, second end face
7 Outer shell surface
8 Cylindrical outer surface
9 Outer shell surface
10 First side face, first end face
11 Second side face, second end face
12 Inner shell surface
13 Cylindrical inner surface
14 Additional ring
15 Inner shell surface
16 First side face, first end face
17 Second side face, second end face
18 Outer shell surface
19 Sealing gap
20 Inlet portion
21 Meandering portion
22 First radial gap
23 First axial gap
24 Second radial gap
25 Second axial gap
26 Third radial gap
27 Axial-radial gap
28 Third axial gap
29 Fourth radial gap
30 Outlet portion
31 Shaft
32 Housing part
33 Ball bearing
34 Shaft nut
A1 Common axis

The invention claimed is:

1. A sealing element (1), for sealing a cylindrical inner surface (13) of a first machine component and a cylindrical outer surface (8) of a second machine component, comprising:
   an inner ring (2),
   an additional ring (14), which is arranged coaxially with respect to the inner ring (2) and is connected to a part of an outer shell surface (7) of the inner ring (2),
   an outer ring (3) arranged coaxially with respect to the inner ring (2), and
   a sealing gap (19), which is formed by the outer shell surface (7) of the inner ring (2), an inner shell surface (12) of the outer ring (3) and by the outer shell surface (18) and a face side (17) of the additional ring (14), and which has a meandering profile in an axial section through the common axis (A1) of the inner ring (2), outer ring (3) and additional ring (14); and
   wherein the profile of the sealing gap (19) has the following profile portions:
   an inlet portion (20) as a first end portion of the sealing gap (19) having a first radius to the common axis (A1);
   an outlet portion (30) as a second end portion of the sealing gap (19) having a second radius to the common axis (A1), wherein the second radius is smaller than the first radius; and
   a meandering portion (21) configured between the inlet portion (20) and the outlet portion (30);
   wherein the outer shell surface (18) of the additional ring (14) forms a boundary surface of the outlet portion (30); and
   wherein the meandering portion (21) of the sealing gap (19), starting from the inlet portion (20) and ending at the outlet portion (30), has the following segments:
   a first radial gap (22);
   a first axial gap (23), which has a radius smaller than the inlet portion (20);
   a second radial gap (24);
   a second axial gap (25), which has a radius smaller than the first axial gap (23);
   a third radial gap (26);
   a combined axial-radial gap (27);
   a third axial gap (28), which has a radius smaller than the outlet portion (30); and
   a fourth radial gap (29); and
   wherein the first axial gap (23) and the second axial gap (25) respectively have a gap height smaller than the inlet portion (20).

2. The sealing element as claimed in claim 1, wherein the inner ring (2) and/or the outer ring (3) comprise a steel material.

3. The sealing element as claimed in claim 1, wherein one or more component surfaces of the inner ring (2) and/or of the outer ring (3) are surface ground.

4. The sealing element as claimed in claim 1, wherein the third radial gap (26) has an offset.

5. The sealing element as claimed in claim 1, wherein a boundary surface of the fourth radial gap (29) is formed by the face side (17) of the additional ring (14).

6. The sealing element as claimed in claim 1, wherein the inner shell surface (15) of the additional ring (14) is connected by means of a press fit to the outer shell surface (7) of the inner ring (2).

7. The sealing element as claimed in claim 1, wherein the outer shell surface (18) of the additional ring (14) forms a radially inner boundary surface of the outlet portion (30).

8. The sealing element as claimed in claim 2, wherein the inner ring (2) and/or the outer ring (3) comprise a hardened steel material.

9. The sealing element as claimed in claim 3, wherein the end faces (5, 6) of the inner ring (2) and/or the end faces (10, 11) of the outer ring (3), are surface ground.

* * * * *